United States Patent
Hamiti et al.

(10) Patent No.: US 10,349,134 B2
(45) Date of Patent: Jul. 9, 2019

(54) ANALYZING MULTIMEDIA CONTENT USING KNOWLEDGE GRAPH EMBEDDINGS

(71) Applicant: Accenture Global Solutions Limited, Dublin (IE)

(72) Inventors: Sofian Hamiti, Dublin (IE); Nut Limsopatham, Dublin (IE); Md Faisal Zaman, Dublin (IE); Freddy Lecue, Castleknock (IE); Victor Oliveira Antonino, Dublin (IE); Gaurav Kaila, Dublin (IE)

(73) Assignee: Accenture Global Solutions Limited, Dublin (IE)

(*) Notice: Subject to any disclaimer, the term of this patent is extended or adjusted under 35 U.S.C. 154(b) by 0 days.

(21) Appl. No.: 15/639,778

(22) Filed: Jun. 30, 2017

(65) Prior Publication Data
US 2018/0332347 A1 Nov. 15, 2018

Related U.S. Application Data

(60) Provisional application No. 62/504,229, filed on May 10, 2017.

(51) Int. Cl.
*H04N 21/454* (2011.01)
*G06F 17/30* (2006.01)
(Continued)

(52) U.S. Cl.
CPC ..... *H04N 21/454* (2013.01); *G06F 17/30029* (2013.01); *H04N 21/2353* (2013.01);
(Continued)

(58) Field of Classification Search
CPC ............. H04N 21/454; H04N 21/4542; H04N 21/25841; H04N 21/2353; H04N 21/435; G06F 17/30029
See application file for complete search history.

(56) References Cited

U.S. PATENT DOCUMENTS 8,762,312 B1* 6/2014 Newstadt .......... G06F 17/30867
706/46
2003/0126267 A1 7/2003 Gutta et al.
(Continued)

FOREIGN PATENT DOCUMENTS

CN 104683320 6/2015
WO WO 01/55922 8/2001

OTHER PUBLICATIONS

TensorFlow, "Vector Representation of Words," https://www.tensorflow.org/tutorials/word2vec, Jun. 19, 2017, 12 pages.
(Continued)

*Primary Examiner* — Pinkal R Chokshi
(74) *Attorney, Agent, or Firm* — Harrity & Harrity, LLP

(57) ABSTRACT

A device may receive multimedia data, metadata, and/or policy data. The device may process the policy data using a first set of techniques to determine a first set of embeddings for the policy data. The device may process the multimedia data or the metadata using a second set of techniques to determine a second set of embeddings for the multimedia data or the metadata. The device may process the first set of embeddings and the second set of embeddings using a knowledge graph to determine whether the multimedia content or the access by the user violates the policy. The device may perform an action based on a result of processing the first set of embeddings and the second set of embeddings. The action may relate to the multimedia content or the access to the multimedia content by the user.

20 Claims, 10 Drawing Sheets

(51) Int. Cl.
  *H04N 21/258* (2011.01)
  *H04N 21/235* (2011.01)
  *H04N 21/435* (2011.01)

(52) U.S. Cl.
  CPC ..... *H04N 21/25841* (2013.01); *H04N 21/435* (2013.01); *H04N 21/4542* (2013.01)

(56) References Cited

U.S. PATENT DOCUMENTS

| | | | | |
|---|---|---|---|---|
| 2008/0228537 | A1* | 9/2008 | Monfried | G06Q 30/02 |
| | | | | 705/14.53 |
| 2009/0016618 | A1* | 1/2009 | Zhou | G06K 9/3266 |
| | | | | 382/232 |
| 2011/0093473 | A1* | 4/2011 | Basso | H04N 21/4394 |
| | | | | 707/748 |
| 2013/0006625 | A1* | 1/2013 | Gunatilake | G10L 15/26 |
| | | | | 704/235 |
| 2013/0347057 | A1* | 12/2013 | Hurwitz | G06F 21/6245 |
| | | | | 726/1 |
| 2014/0007154 | A1 | 1/2014 | Seibold et al. | |
| 2015/0215186 | A1* | 7/2015 | Alonso Franco | H04L 63/102 |
| | | | | 709/224 |
| 2015/0249852 | A1 | 9/2015 | Tang et al. | |
| 2016/0071162 | A1* | 3/2016 | Ogawa | G06Q 30/0269 |
| | | | | 705/14.66 |
| 2016/0180108 | A1 | 6/2016 | Nichols et al. | |
| 2016/0295244 | A1* | 10/2016 | Carney Landow | H04N 21/84 |
| 2017/0078718 | A1* | 3/2017 | Ioffe | H04N 21/23439 |
| 2017/0272818 | A1* | 9/2017 | Gattis | H04N 21/45452 |

OTHER PUBLICATIONS

Pu et al., "Adaptive Feature Abstraction for Translating Video to Language," under review as a conference paper at ICLR 2017, Nov. 23, 2016, 16 pages.

Gan et al., "Semantic Compositional Networks for Visual Captioning," Mar. 28, 2017, 13 pages.

* cited by examiner

ANALYZING MULTIMEDIA CONTENT USING KNOWLEDGE GRAPH EMBEDDINGS

RELATED APPLICATION(S)

This application claims priority under 35 U.S.C. § 119 to U.S. Provisional Patent Application No. 62/504,229, filed on May 10, 2017, the content of which is incorporated by reference herein in its entirety.

BACKGROUND

Multimedia may include content that uses a combination of different content media forms, such as text, audio, images, animations, video, and interactive content. Multimedia may be differentiated from other media that use only rudimentary computer displays, such as text-only or traditional forms of printed or hand-produced material. Multimedia can be recorded, played, displayed, interacted with, or accessed by information content processing devices, such as computerized and electronic devices.

SUMMARY

According to some possible implementations, a device may include one or more processors to receive multimedia data, metadata, and policy data. The multimedia data may be related to multimedia content. The policy data may be related to a policy that restricts access to particular multimedia content. The one or more processors may process the policy data using a first set of techniques to identify a set of terms or phrases associated with the policy data. The one or more processors may determine a first set of embeddings for the set of terms or phrases after identifying the set of terms or phrases. The first set of embeddings may identify the policy data. The one or more processors may process the multimedia data and/or the metadata using a second set of techniques to determine a second set of embeddings. The second set of embeddings may identify the multimedia data. The second set of embeddings may identify the metadata. The one or more processors may process the first set of embeddings and the second set of embeddings using a knowledge graph to determine whether the multimedia content violates the policy. The one or more processors may perform an action based on a result of processing the first set of embeddings and the second set of embeddings.

According to some possible implementations, a method may include receiving, by a device, multimedia data, metadata, or policy data. The multimedia data, the metadata, or the policy data may be used to determine whether multimedia content or access to the multimedia content by a user violates a policy associated with the multimedia content. The method may include processing, by the device, the policy data using a first set of techniques to determine a first set of embeddings for the policy data. The method may include processing, by the device, the multimedia data or the metadata using a second set of techniques to determine a second set of embeddings for the multimedia data or the metadata. The method may include processing, by the device, the first set of embeddings and the second set of embeddings using a knowledge graph to determine whether the multimedia content or the access by the user violates the policy. The method may include performing, by the device, an action based on a result of processing the first set of embeddings and the second set of embeddings. The action may relate to the multimedia content or the access to the multimedia content by the user.

According to some possible implementations, a non-transitory computer-readable medium may store one or more instructions that, when executed by one or more processors, cause the one or more processors to receive multimedia data, metadata, and/or policy data. The multimedia data may be related to multimedia content. The metadata may be related to a destination to which the multimedia content is to be provided. The policy data may be related to a policy that restricts access to particular multimedia content or from a particular destination. The one or more instructions, when executed by the one or more processors, may cause the one or more processors to process the policy data using a first set of techniques to identify a set of terms or phrases associated with the policy data. The one or more instructions, when executed by the one or more processors, may cause the one or more processors to determine a first set of embeddings for the set of terms or phrases to permit determination of whether the multimedia content or the access from the destination violates the policy. The first set of embeddings may identify information associated with the policy.

The one or more instructions, when executed by the one or more processors, may cause the one or more processors to process the multimedia data or the metadata using a second set of techniques to determine a second set of embeddings. The second set of embeddings may identify information associated with the multimedia content or the destination to which the multimedia content is to be provided. The one or more instructions, when executed by the one or more processors, may cause the one or more processors to process the first set of embeddings and the second set of embeddings to determine whether the multimedia content or the access from the destination violates the policy. The one or more instructions, when executed by the one or more processors, may cause the one or more processors to perform an action related to the multimedia content or the access to the multimedia content from the destination after processing the first set of embeddings and the second set of embeddings.

DETAILED DESCRIPTION

The following detailed description of example implementations refers to the accompanying drawings. The same reference numbers in different drawings may identify the same or similar elements.

Multimedia content moderation may be controlled by a policy. For example, the policy may restrict access to particular multimedia content (e.g., violent content, content associated with a particular rating, offensive content, etc.), may restrict access based on an age, a location, and/or the like of a user of a client device attempting to access the multimedia content, and/or the like. In some cases, an organization and/or an individual may lack a computer-based technique for automatically analyzing multimedia content, and determining whether a user of a client device is permitted to access the multimedia content based on a policy related to the multimedia content.

Some implementations, described herein, provide a multimedia analysis platform that is capable of automatically analyzing multimedia content and determining whether a policy permits a particular user to access the multimedia content (e.g., based on an age of the user, a location of the user, a type of multimedia content, etc.). In this way, the multimedia analysis platform may automatically and dynamically enforce a content-related policy. This improves application of a policy to multimedia content and/or increases an efficiency of applying a policy to multimedia content. In addition, this conserves processing resources that would otherwise be consumed due to an inefficient review of content. Further, this permits review of an amount of content that cannot be processed manually or objectively by a human actor, or processed in a threshold amount of time by a human actor.

FIGS. 1A-1G are diagrams of an overview of an example implementation 100 described herein. Implementation 100 includes a multimedia analysis platform and a client device (shown in FIG. 1G). Implementations described herein with respect to FIGS. 1A-1G may be used to process thousands, millions, billions, etc., of multimedia data elements relative to hundreds, thousands, millions, etc., of content-related policies. In this way, the multimedia analysis platform may process a data set that cannot be processed manually or objectively by a human actor. In addition, although implementation 100 shows a single client device, in practice, there may be hundreds, thousands, millions, etc. of client devices in communication with the multimedia analysis platform.

Figure 1A:
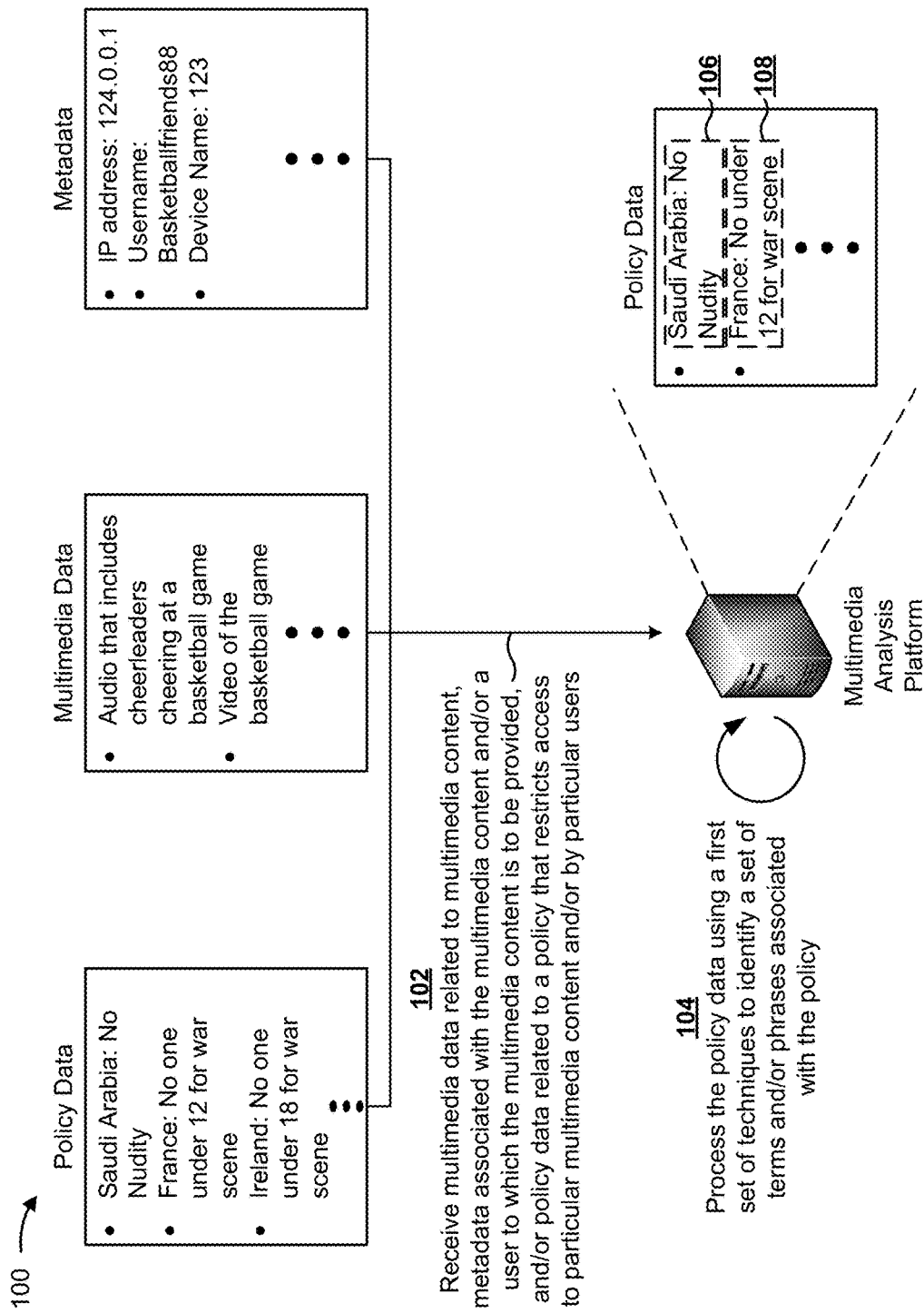
FIGS. 1A-1G are diagrams of an overview of an example implementation described herein.

As shown in FIG. 1A, and by reference number 102, the multimedia analysis platform may receive multimedia data related to multimedia content, metadata associated with the multimedia content and/or a user to which the multimedia content is to be provided, and/or policy data related to a policy that restricts access to particular multimedia content and/or by particular users. For example, the multimedia analysis platform may receive policy data indicating that multimedia data available in Saudi Arabia cannot contain nudity (e.g., shown as "Saudi Arabia: No Nudity"). As another example, the multimedia analysis platform may receive policy data indicating that multimedia data available in France containing a war scene cannot be accessed by anyone under 12 years of age (e.g., shown as "France: No one under 12 for war scene"). As still another example, the multimedia analysis platform may receive policy data indicating that multimedia data available in Ireland containing a war scene cannot be accessed by anyone under 18 years of age (e.g., shown as "Ireland: No one under 18 for war scene").

The multimedia data, that the multimedia analysis platform may receive, may include audio that includes cheerleaders cheering at a basketball game, video of the basketball game, and/or the like. Additionally, or alternatively, the metadata that the multimedia analysis platform receives may include metadata identifying a user requesting the multimedia data (e.g., an Internet Protocol (IP) address of a client device (not shown in FIG. 1A) requesting the multimedia data, a username associated with a user requesting the multimedia data, a device name of the client device requesting the multimedia content, etc.).

As shown by reference number 104, the multimedia analysis platform may process the policy data using a first set of techniques to identify a set of terms and/or phrases associated with the policy. For example, the multimedia analysis platform may use a natural language processing technique, a computational linguistics technique, a text analysis technique, and/or the like, to identify a set of terms and/or phrases included in the policy data.

As shown by reference number 106, the multimedia analysis platform may identify a set of terms and/or phrases that indicate multimedia data, destined for a client device located in Saudi Arabia, cannot contain nudity. For example, the term and/or phrase may include "Saudi Arabia: No Nudity."

As shown by reference number 108, the multimedia analysis platform may identify a set of terms and/or phrases that indicate that multimedia data, destined for a client device located in France and associated with a user under 12 years of age, cannot contain a war scene. For example, the term and/or phrase may include "France: No one under 12 for war scene."

Figure 1B:
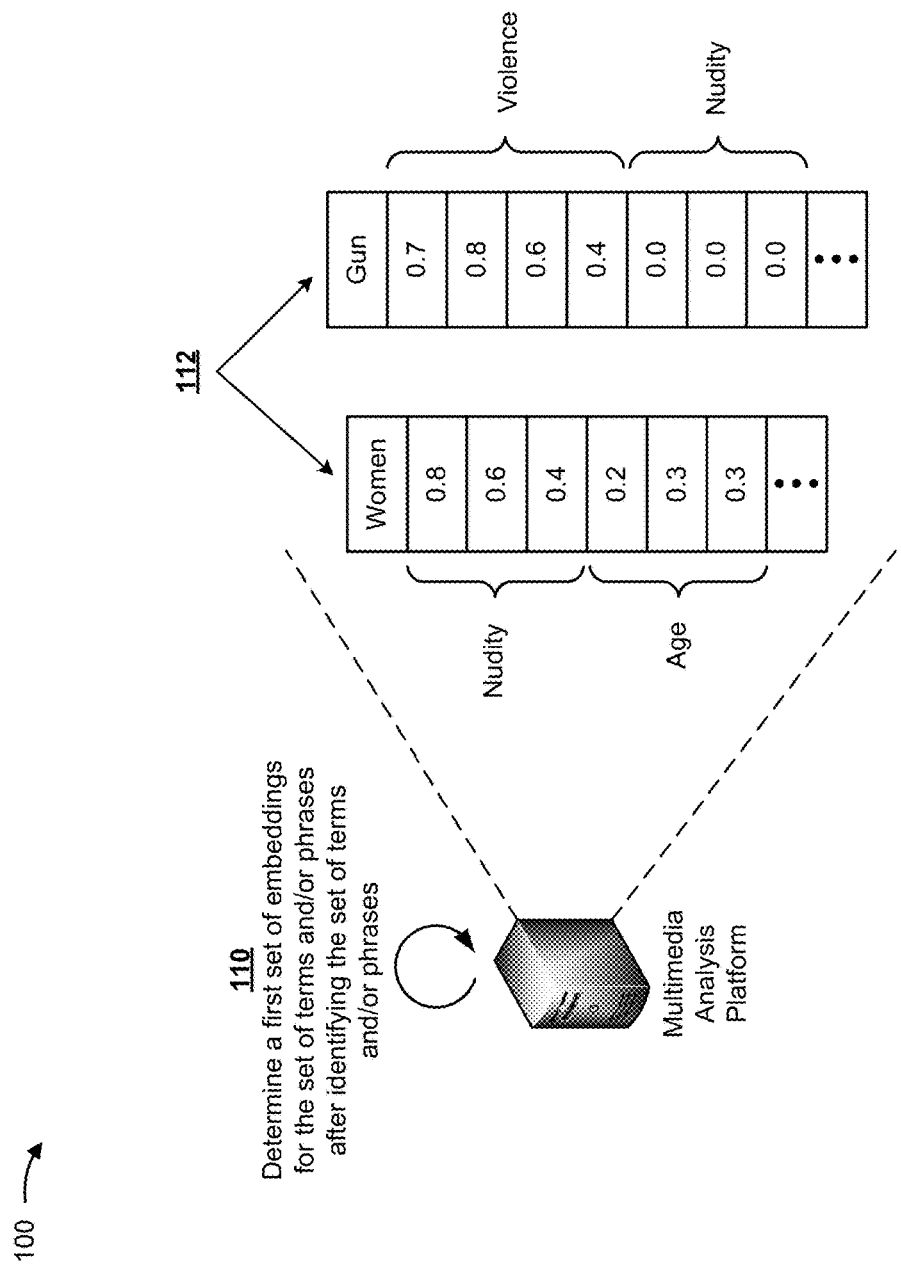

As shown in FIG. 1B, and by reference number 110, the multimedia analysis platform may determine a first set of embeddings for the set of terms and/or phrases after identifying the set of terms and/or phrases. In some implementations, the multimedia analysis platform may determine the first set of embeddings for the set of terms and/or phrases using a technique, such as a Word2Vec technique.

Prior to determining the first set of embeddings for the set of terms and/or phrases identified in the policy data, the multimedia analysis platform may identify a set of terms and/or phrases that is semantically similar to the set of terms and/or phrases identified in the policy data. For example, the multimedia analysis platform may use WordNet, BabelNet, and/or the like to identify a set of terms and/or phrases that is similar to the set of terms and/or phrases identified in the policy data. This permits the multimedia analysis platform to more intelligently determine restrictions associated with a policy relative to not identifying semantically similar terms and/or phrases.

As shown by reference number 112, the set of embeddings may include a numerical multi-dimensional representation of a concept. For example, the numbers included in an embedding may indicate a likelihood that a concept (e.g., Woman or Gun) is associated with dimensions of other concepts (e.g., nudity, violence, age), where a higher number indicates a higher likelihood relative to a lower number. For example, the term "gun" present in multimedia data may be highly correlated (e.g., a likelihood greater than a threshold, such as 0.5) with various dimensions of violence (e.g., 0.7; 0.8; 0.4; and 0.6) and not highly correlated with nudity (e.g., 0.0; 0.0; and 0.0). As another example, the term "women" present in multimedia data may be highly correlated (e.g., a likelihood greater than a threshold, such as 0.5) with various dimensions of nudity (e.g., 0.8; 0.6; and 0.4) and not highly correlated with age (e.g., 0.2; 0.3; and 0.3). In this way, the multimedia analysis platform may determine whether the presence of a concept (e.g., a gun) in multimedia data likely violates a concept in a policy (e.g., a prohibition on violence included in multimedia content).

Figure 1C:
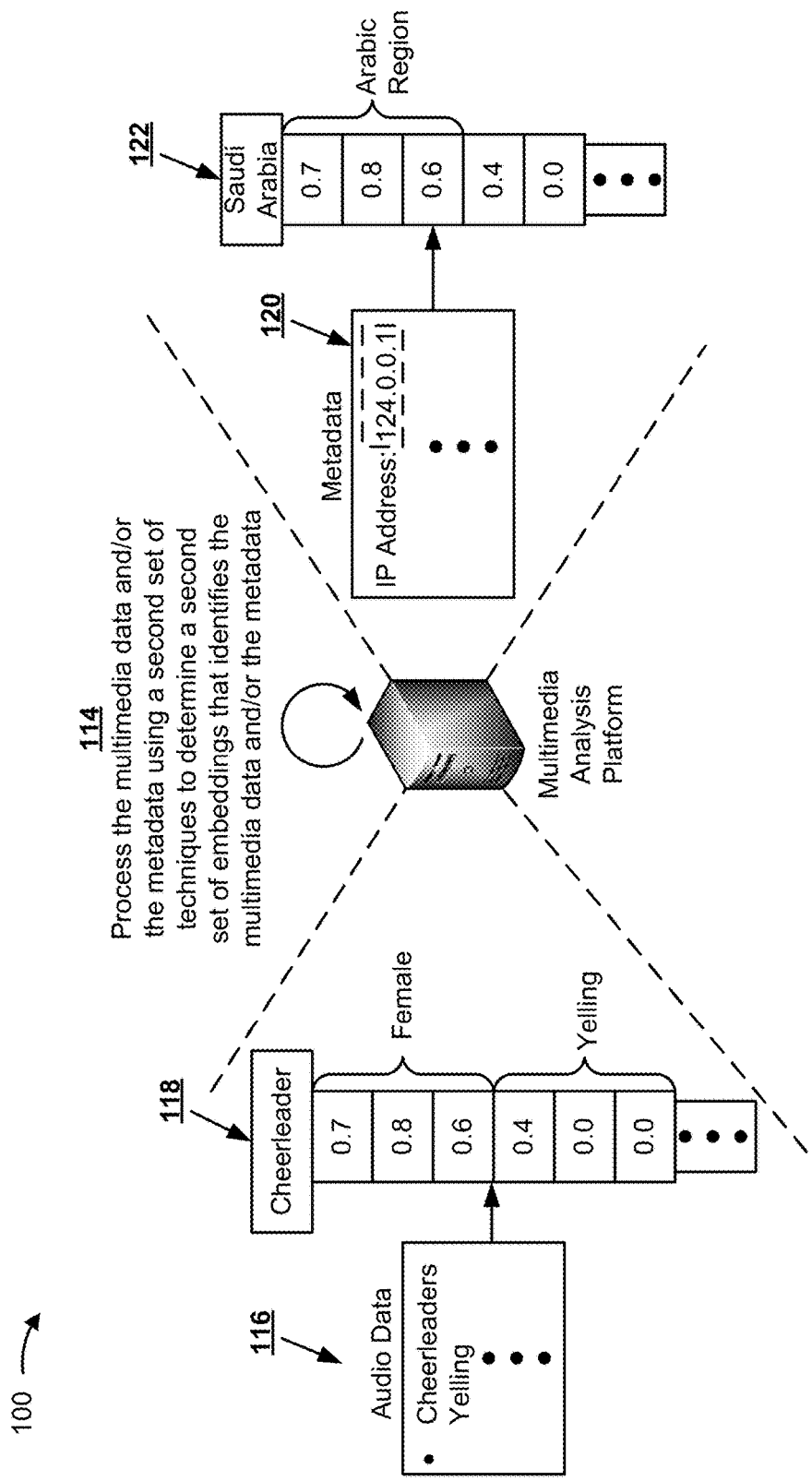

As shown in FIG. 1C, and by reference number 114, the multimedia analysis platform may process the multimedia data and/or metadata using a second set of techniques to determine a second set of embeddings that identifies the multimedia data and/or the metadata. The manner in which the multimedia analysis platform processes the multimedia data and/or metadata may differ based on a type of data the multimedia analysis platform is processing.

As shown by reference number 116, the multimedia analysis platform may process audio data included in the multimedia data. The multimedia analysis platform may process audio data to extract audio sequences from the audio data, and may process the audio sequences using a recurrent neural network to identify sounds included in the audio data. For example, the multimedia analysis platform may identify women's voices in the audio data (e.g., cheerleaders), that the audio data includes yelling, and/or the like.

As shown by reference number 118, the multimedia analysis platform may determine a set of embeddings for the sounds identified in the audio data. In some implementations, the set of embeddings may identify likelihoods that various dimensions related to female-related sounds (e.g., 0.7; 0.8; and 0.6) and yelling-related sounds (e.g., 0.4; 0.0; and 0.0) indicate the presence of a cheerleader in the multimedia data.

As shown by reference number 120, the multimedia analysis platform may process the metadata. In some implementations, the multimedia analysis platform may process the metadata using natural language processing, text analysis, computational linguistics, and/or the like, to identify a set of terms and/or phrases included in the metadata. For example, the multimedia analysis platform may identify an IP address (e.g., IP address: 124.0.0.1), a device name, and/or the like included in the metadata.

As shown by reference number 122, the multimedia analysis platform may determine a set of embeddings for the set of terms and/or phrases included in the metadata. The set of embeddings may identify likelihoods that various dimensions related to an Arabic Region (e.g., 0.7; 0.8; and 0.6) and related to a region other than an Arabic Region (e.g., 0.4 and 0.0) indicate that the IP address (e.g., IP address 124.0.0.1) identifies a client device, to which the multimedia data is destined, that is located in Saudi Arabia.

Figure 1D:
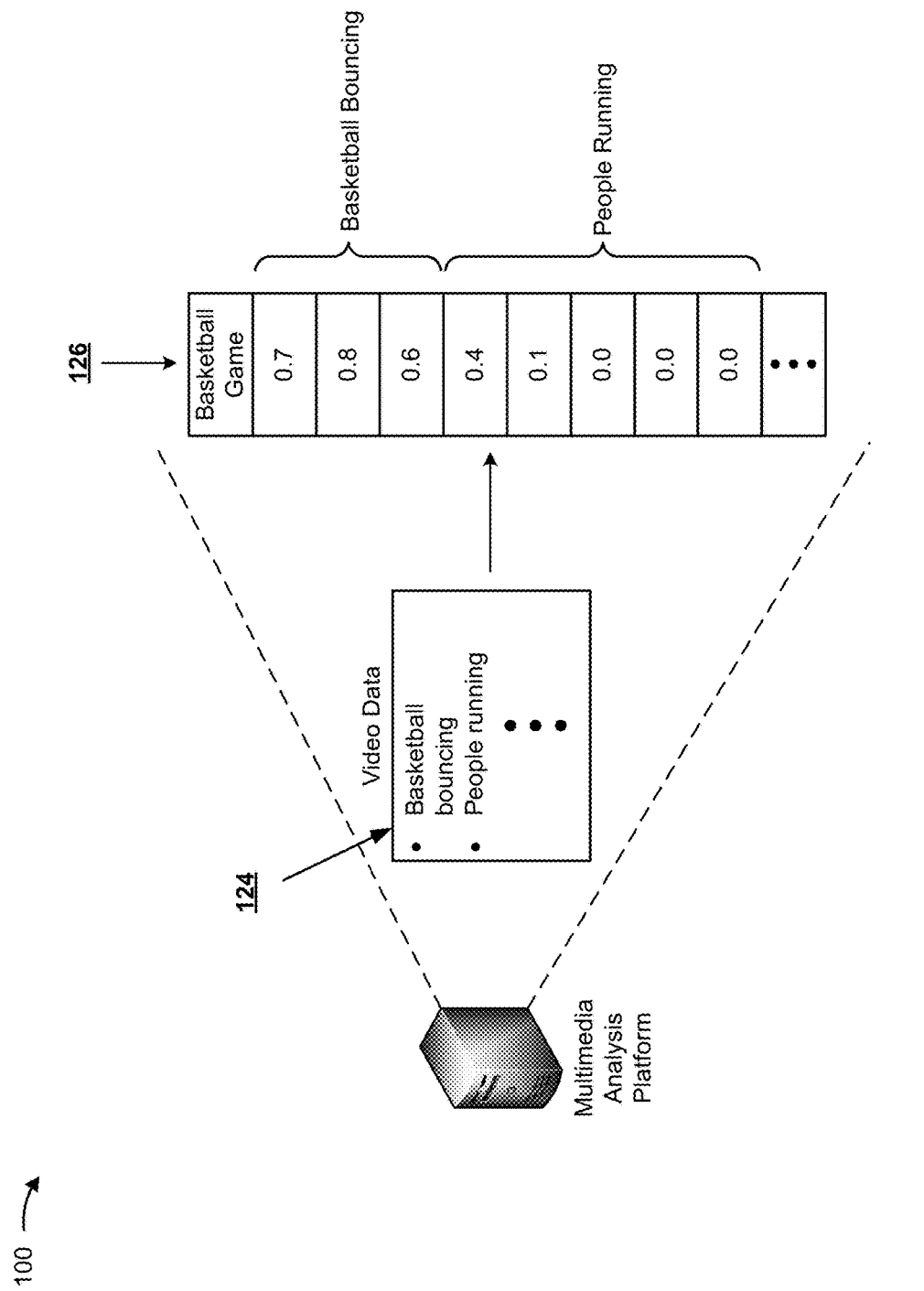

As shown in FIG. 1D, and by reference number 124, the multimedia analysis platform may process video data included in the multimedia data. The multimedia analysis platform may extract video sequences from the video data, and/or may extract frames from the video sequences. For example, the multimedia analysis platform may process the video sequences and/or frames using a convolutional neural network, a motion extraction model, a recurrent neural network, and/or the like, to identify objects in the frames and/or video sequences, actions shown in the frames and/or video sequences, and/or the like. For example, and as shown, the multimedia analysis platform may identify, in the video data, a basketball bouncing, people running, and/or the like, that are shown in the frames and/or video sequences.

As shown by reference number 126, the multimedia analysis platform may determine a set of embeddings for an object, a motion, an action, and/or the like, identified in the video data. The set of embeddings may identify likelihoods that a basketball bouncing (e.g., 0.7; 0.8; 0.6; and 0.4) and people running (e.g., 0.1; 0.0; 0.0; and 0.0) indicate a basketball game shown in the video data.

Figure 1E:
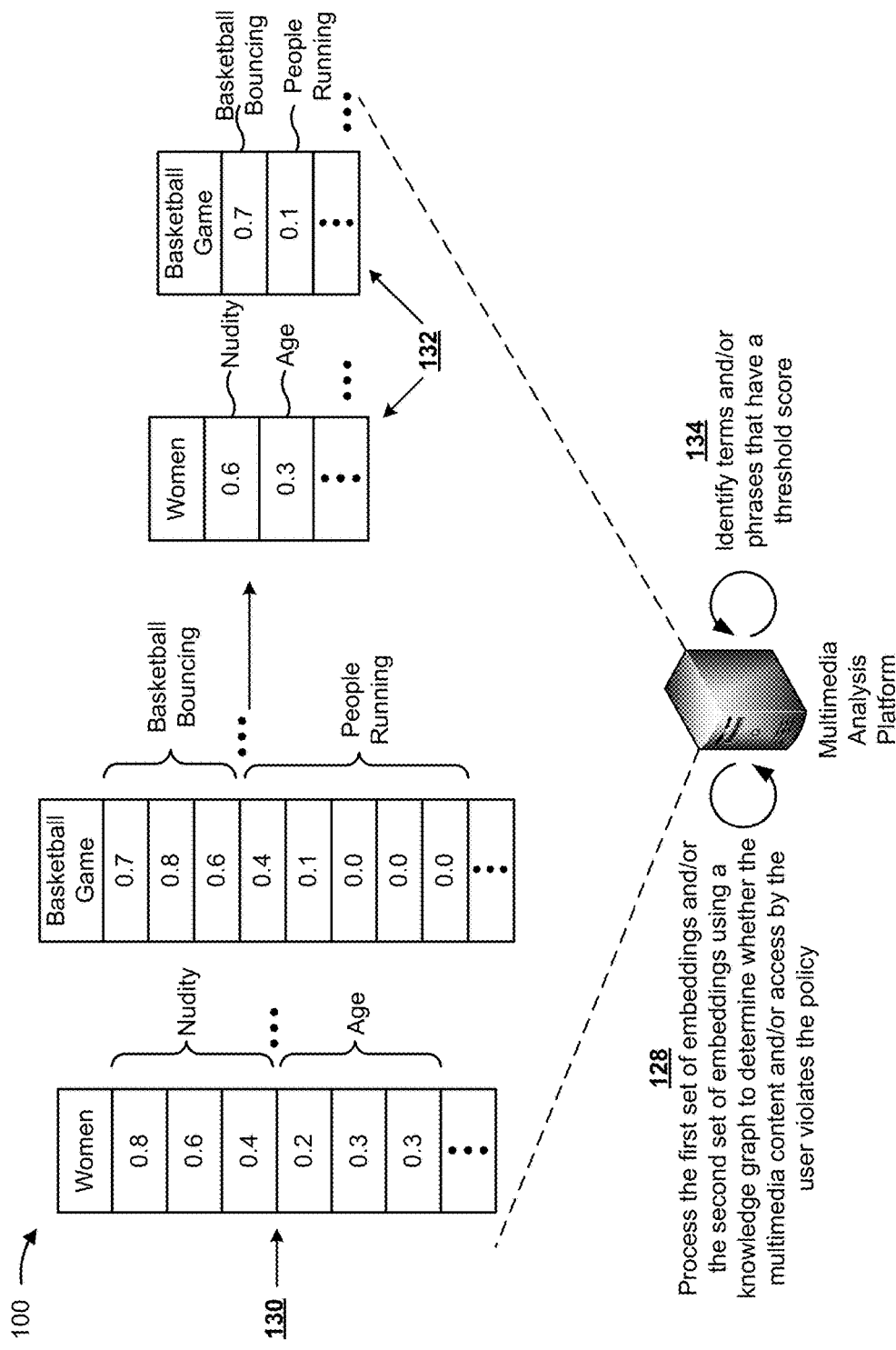

As shown in FIG. 1E, and by reference number 128, the multimedia analysis platform may process the first set of embeddings and/or the second set of embeddings using a knowledge graph to determine whether the multimedia content and/or access by the user violates the policy. For example, the multimedia analysis platform may use the knowledge graph to identify matches between multimedia data, metadata, and policy data (e.g., to identify multimedia content and/or attempted access to the multimedia content that violates or complies with a content-related policy).

As shown by reference number 130, when processing the first set of embeddings and/or the second set of embeddings, the multimedia analysis platform may identify a set of terms and/or phrases associated with the first set of embeddings and/or the second set of embeddings. In some implementations, for the first set of embeddings, the multimedia analysis platform may identify the terms "nudity" and "age." For the second set of embeddings, the multimedia analysis platform may identify the terms "basketball bouncing" and "people running."

As shown by reference number 132, the multimedia analysis platform may determine a score for the set of terms and/or phrases identified with respect to the first set of embeddings and the second set of embeddings. When determining the score for the set of terms and/or phrases, the multimedia analysis platform may determine an average score of likelihoods of dimensions associated with each term and/or phrase. For example, the multimedia analysis platform may determine an average score of 0.6 for likelihoods of dimensions associated with the term "nudity," an average score of 0.3 for likelihoods of dimensions associated with the term "age," an average score of 0.7 for likelihoods of dimensions associated with the term "basketball bouncing," and an average score of 0.1 for likelihoods of dimensions associated with the term "people running."

As shown by reference number 134, the multimedia analysis platform may identify terms and/or phrases that have a threshold score. For example, the multimedia analysis platform may identify terms that have a threshold score of 0.5 (e.g., "nudity" and "basketball bouncing"). In this way, the multimedia analysis platform may identify a set of terms and/or phrases that have the highest probability of identifying the multimedia content, the metadata, and/or the policy (e.g., relative to other terms and/or phrases associated with the first set of embeddings and/or the second set of embeddings).

Figure 1F:
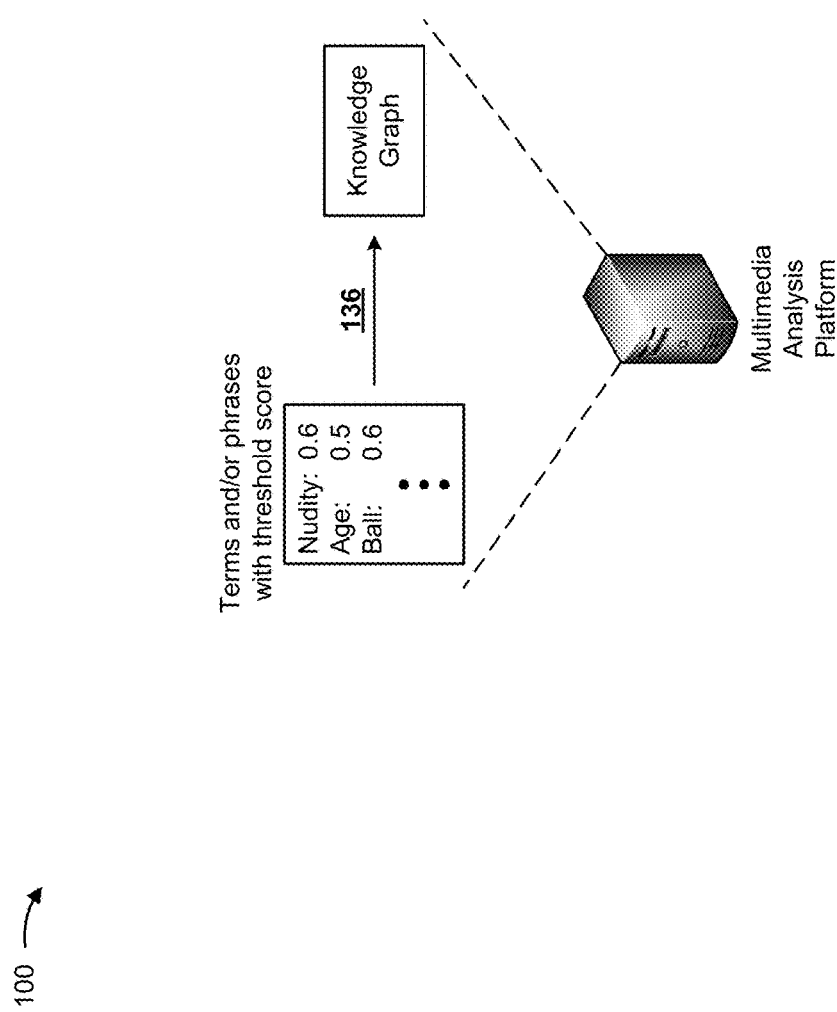

As shown in FIG. 1F, and by reference number 136, the multimedia analysis platform may populate a knowledge graph with terms and/or phrases associated with the first set of embeddings and/or the second set of embeddings. The terms and/or phrases associated with the first set of embeddings and/or the second set of embeddings that the multimedia analysis platform uses may be terms with a threshold score.

Figure 1G:
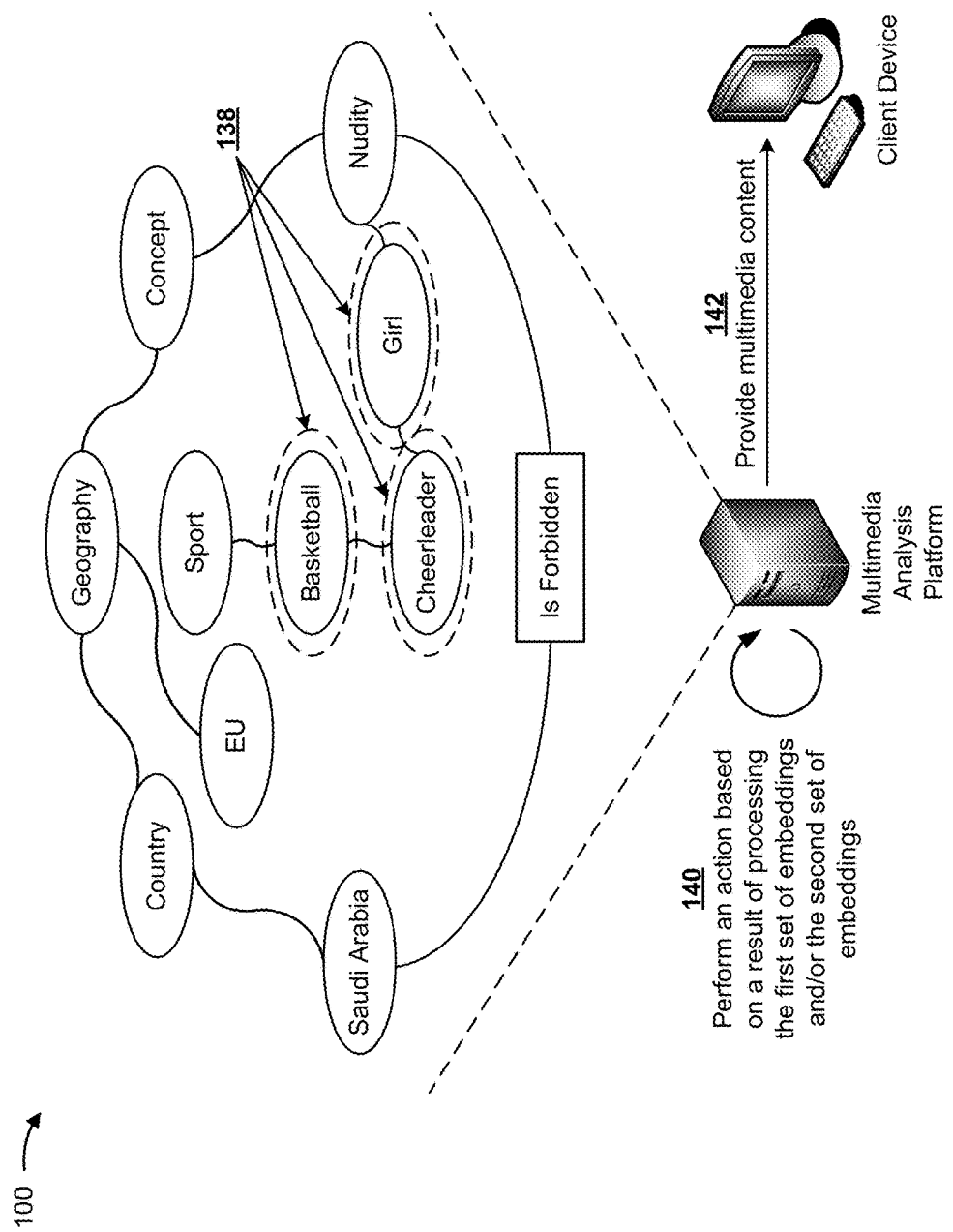

As shown in FIG. 1G, and by reference number 138, the multimedia analysis platform may identify edges common to the terms and/or phrases used to populate the knowledge graph. Identifying edges may permit the multimedia analysis platform to determine whether terms and/or phrases that identify the multimedia content and/or a destination for the multimedia content match terms and/or phrases associated with a policy (e.g., relative to other terms and/or phrases). As shown, the multimedia analysis platform may determine that the terms and/or phrases associated with the multimedia content and/or the metadata (e.g., "basketball," "cheerleader," and "girl") do not violate a corresponding content-based policy (e.g. based on determining that the multimedia content does not include "nudity").

As shown by reference number 140, the multimedia analysis platform may perform an action based on a result of processing the first set of embeddings and/or the second set of embeddings. For example, the multimedia analysis platform may generate a report that identifies a result of an analysis of the multimedia data, the metadata, and/or the policy data.

As shown by reference number 142, the multimedia analysis platform may provide multimedia content to the client device (e.g., based on determining that the multimedia content does not violate a policy that applies to the multimedia content and/or access to the multimedia content). The multimedia analysis platform may provide the multimedia content to the client device for display via the client device.

In this way, the multimedia analysis platform may automatically and dynamically enforce a content-related policy. This improves application of a policy to multimedia content and/or increases an efficiency of applying a policy to multimedia content. In addition, this conserves processing resources that would otherwise be consumed due to an inefficient review of content. Further, this permits review of an amount of content that cannot be processed manually or objectively by a human actor, or processed in a threshold amount of time by a human actor.

As indicated above, FIGS. 1A-1G are provided merely as an example. Other examples are possible and may differ from what was described with regard to FIGS. 1A-1G.

Figure 2:
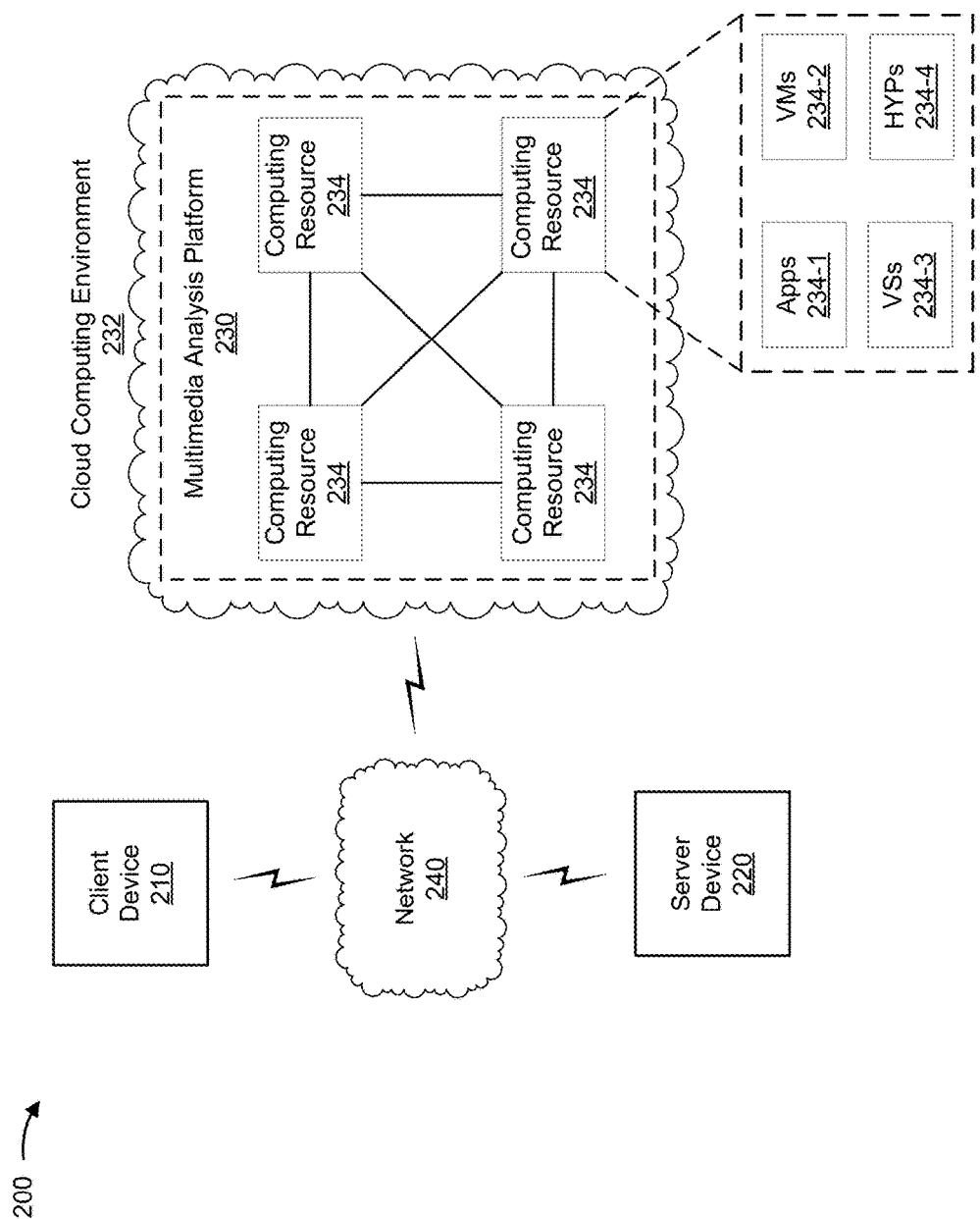
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, a multimedia analysis platform 230 provided within a cloud computing environment 232 that includes a set of computing resources 234, and a network 240. Devices of environment 200 may interconnect via wired connections, wireless connections, or a combination of wired and wireless connections.

Client device 210 includes one or more devices capable of receiving, generating, storing, processing, and/or providing information associated with multimedia content, a policy related to the multimedia content, and/or a destination of the multimedia content. For example, client device 210 may include a desktop computer, a mobile phone (e.g., a smart phone or a radiotelephone), a laptop computer, a tablet computer, a gaming device, a wearable communication device (e.g., a smart wristwatch or a pair of smart eyeglasses), or a similar type of device. In some implementations, client device 210 may provide data related to a user of client device 210 that is attempting to access multimedia content, as described elsewhere herein. Additionally, or alternatively, client device 210 may receive information identifying a result of an analysis performed by multimedia analysis platform 230 (e.g., to be provided for display), as described elsewhere herein. While a single client device 210 is shown in FIG. 2, in practice, there can be hundreds, thousands, millions, etc. of client devices 210 in communication with multimedia analysis platform 230.

Server device 220 includes one or more devices capable of receiving, generating, storing, processing, and/or providing information associated multimedia content, a policy related to the multimedia content, and/or a destination of the multimedia content. For example, server device 220 may include a server (e.g., in a data center or a cloud computing environment), a data center (e.g., a multi-server micro data center), a workstation computer, a virtual machine (VM) provided in a cloud computing environment, or a similar type of device. In some implementations, server device 220 may provide, to multimedia analysis platform 230, information related to a policy associated with multimedia content, as described elsewhere herein. Additionally, or alternatively, server device 220 may store information related to a result of an analysis performed by multimedia analysis platform 230 (e.g., to facilitate machine learning to improve future analyses of multimedia content and/or analyses by other multimedia analysis platforms 230), as described elsewhere herein. While a single server device 220 is shown in FIG. 2, in practice, there can be hundreds, thousands, millions, etc. of server devices 220 in communication with multimedia analysis platform 230.

Multimedia analysis platform 230 includes one or more devices capable of automatically analyzing multimedia data, policy data, and/or metadata to determine whether a content-related policy prevents access to multimedia content by a user of client device 210. For example, multimedia analysis platform 230 may include a cloud server or a group of cloud servers. In some implementations, multimedia analysis platform 230 may be designed to be modular such that certain software components can be swapped in or out depending on a particular need. As such, multimedia analysis platform 230 may be easily and/or quickly reconfigured for different uses.

In some implementations, as shown in FIG. 2, multimedia analysis platform 230 may be hosted in cloud computing environment 232. Notably, while implementations described herein describe multimedia analysis platform 230 as being hosted in cloud computing environment 232, in some implementations, multimedia analysis platform 230 may not be cloud-based (i.e., may be implemented outside of a cloud computing environment) or may be partially cloud-based.

Cloud computing environment 232 includes an environment that hosts multimedia analysis platform 230. Cloud computing environment 232 may provide computation, software, data access, storage, and/or other services that do not require end-user knowledge of a physical location and configuration of a system and/or a device that hosts multimedia analysis platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host multimedia analysis platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, and/or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with multimedia analysis platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of client device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
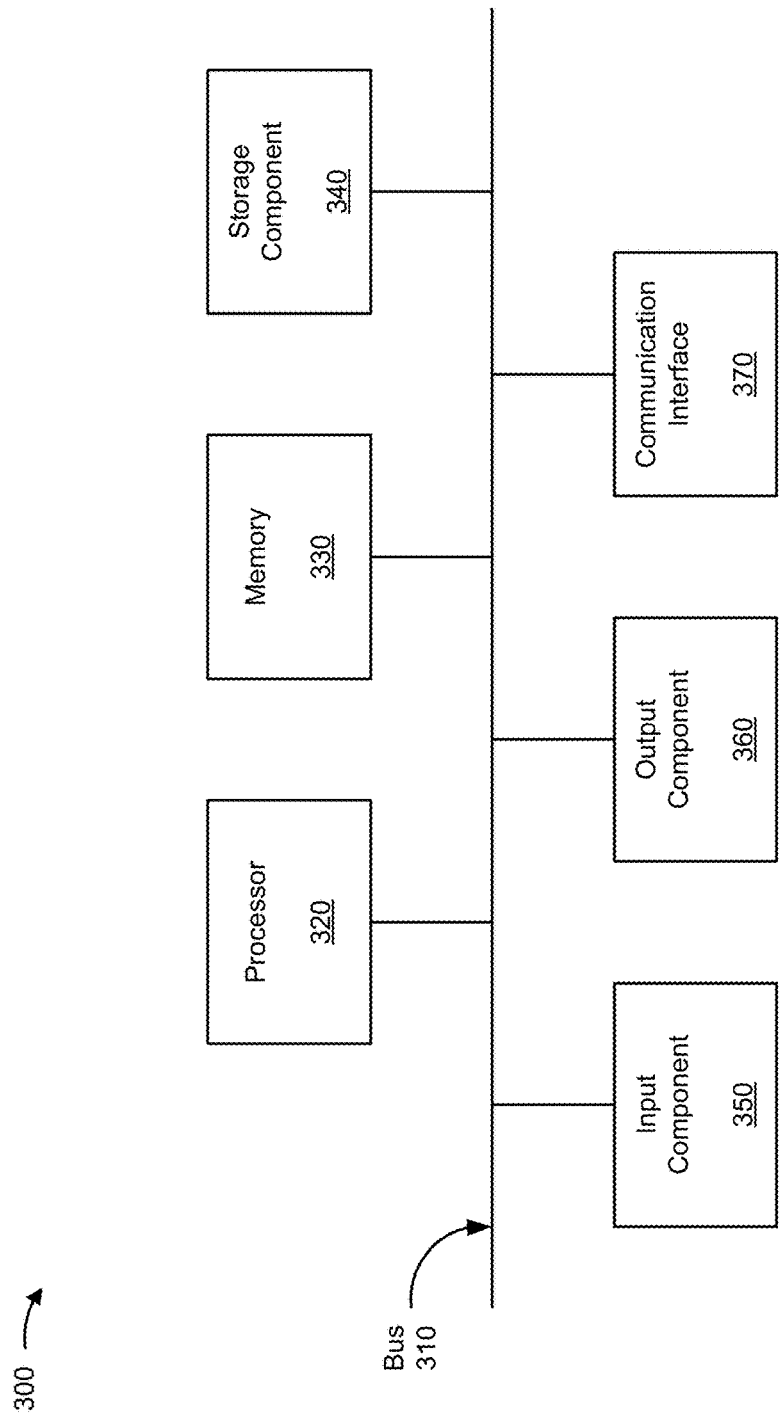
FIG. 3 is a diagram of example components of one or more devices of FIG. 2.

FIG. 3 is a diagram of example components of a device 300. Device 300 may correspond to client device 210, server device 220, multimedia analysis platform 230, and/or computing resource 234. In some implementations, client device 210, server device 220, multimedia analysis platform 230, and/or computing resource 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operations and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
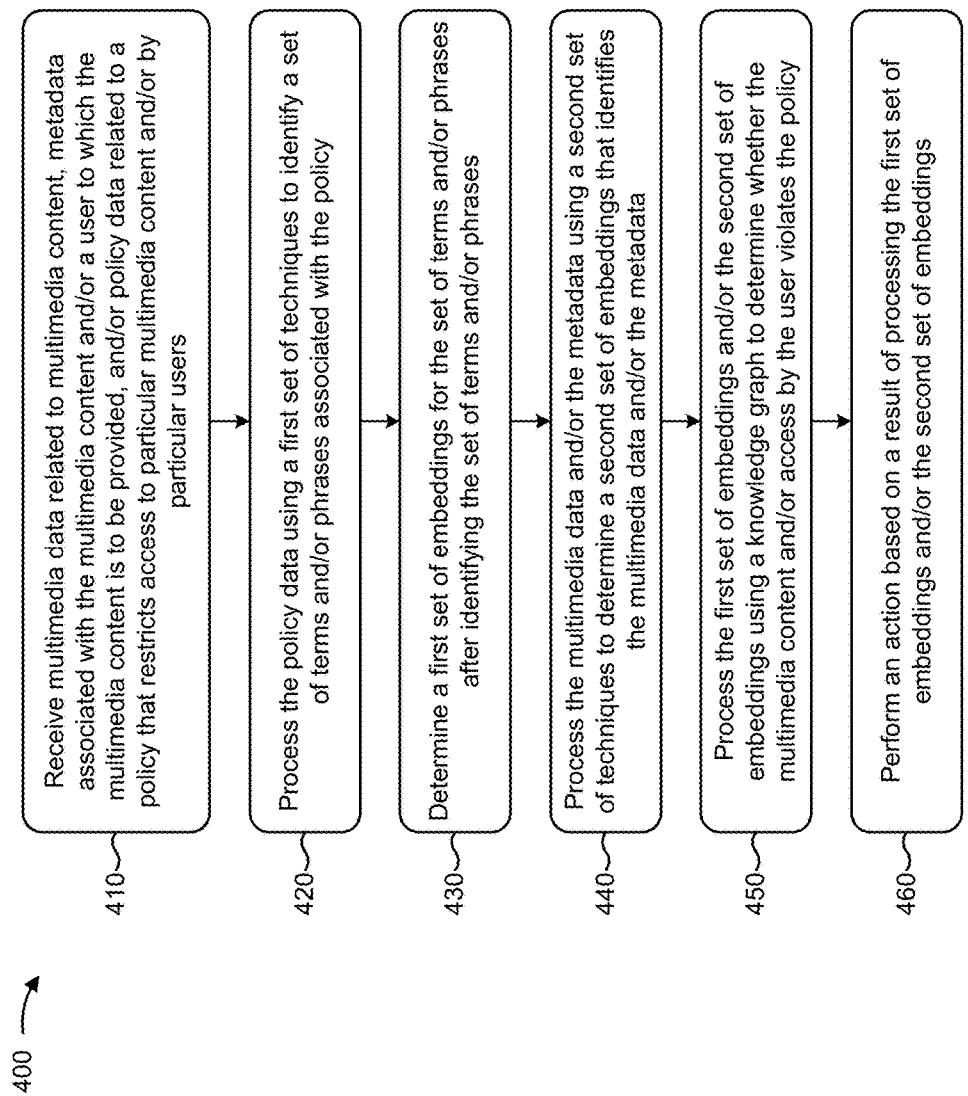
FIG. 4 is a flow chart of an example process for analyzing multimedia content using knowledge graph embeddings.

FIG. 4 is a flow chart of an example process 400 for analyzing multimedia content using knowledge graph embeddings. In some implementations, one or more process blocks of FIG. 4 may be performed by multimedia analysis platform 230. In some implementations, one or more process blocks of FIG. 4 may be performed by another device or a group of devices separate from or including multimedia analysis platform 230, such as client device 210, and/or server device 220.

As shown in FIG. 4, process 400 may include receiving multimedia data related to multimedia content, metadata associated with the multimedia content and/or a user to which the multimedia content is to be provided, and/or policy data related to a policy that restricts access to particular multimedia content and/or by particular users (block 410). For example, multimedia analysis platform 230 may receive multimedia data related to multimedia content, metadata associated with the multimedia content, metadata associated with a user to which the multimedia content is to be provided, metadata associated with a characteristic of a user to whom the multimedia content is to be provided (e.g., an age, a location, a job title, etc.), metadata associated with a time when the multimedia content is to be provided, and/or policy data related to a policy that restricts access to particular multimedia content and/or by particular users.

In some implementations, multimedia analysis platform 230 may receive millions, billions, trillions, etc., of data elements when receiving the multimedia data, the policy data, and/or the metadata. In this way, multimedia analysis platform 230 may receive a data set that cannot be processed manually or objectively by a human actor.

In some implementations, multimedia content may include video content, audio content, animation content, an image, text content, and/or the like. In this way, multimedia analysis platform 230 may process data related to multiple types of multimedia content simultaneously, at different times, and/or the like. This permits multimedia analysis platform 230 to be used in a variety of analysis scenarios, thereby improving a use of multimedia analysis platform 230. In some implementations, and as a specific example, multimedia content may include video data and audio data. In some implementations, when the multimedia data includes video data and audio data, multimedia analysis platform 230 may align video data and corresponding audio data, such as to permit multimedia analysis platform 230 to identify a visual context of audio and/or an audio context of video. This may permit multimedia analysis platform 230 to more accurately determine whether multimedia content and/or access to the multimedia content violates a policy relative to not aligning video data and corresponding audio data.

In some implementations, a policy may include a set of rules related to access to multimedia content. For example, a policy may restrict access to a particular type of multimedia content and/or by a particular user (e.g., based on a geographic location of the user, a service level of an account associated with the user, whether the multimedia content includes objectionable content, such as nudity, violence, particular language, etc.), and/or the like. In some implementations, policy data may include text data (e.g., a document, a webpage, a text file, etc.).

In some implementations, metadata may include information associated with a user of client device 210 that is attempting to access the multimedia content. For example, metadata may include a username, a password, an IP address, a MAC address, account information (e.g., a service level of an account, an account number, etc.), and/or the like associated with a user attempting to access multimedia content and/or a destination of the multimedia content. Additionally, or alternatively, and as another example, metadata may be associated with a user associated with an organization and may identify a job title of the user, a level of the user within the organization, a role of the user, a clearance level of the user (e.g., a clearance level associated with viewing sensitive or proprietary information), and/or the like to permit multimedia analysis platform 230 to determine whether access to content violates rules related to content that employees of the organization can access.

In some implementations, multimedia analysis platform 230 may receive the multimedia data as multimedia content is being requested (e.g., in real-time or near real-time). Additionally, or alternatively, multimedia analysis platform 230 may receive the multimedia data prior to the multimedia content being requested. For example, multimedia analysis platform 230 may process the multimedia content preemptively, such as to preemptively determine whether multimedia content violates a policy.

In this way, multimedia analysis platform 230 may receive multimedia data, metadata, and/or policy data to permit multimedia analysis platform 230 to process the multimedia data, the metadata, and/or the policy data.

As further shown in FIG. 4, process 400 may include processing the policy data using a first set of techniques to identify a set of terms and/or phrases associated with the policy (block 420). For example, multimedia analysis platform 230 may process the policy data using a first set of techniques to identify a set of terms and/or phrases associated with the policy.

In some implementations, multimedia analysis platform 230 may process millions, billions, trillions, etc., of data elements associated with hundreds, thousands, millions, etc., of policies. In this way, multimedia analysis platform 230 may process a data set that cannot be processed manually or objectively by a human actor.

In some implementations, when processing the policy data using the first set of techniques, multimedia analysis platform 230 may process the policy data using natural language processing, text analysis, computational linguistics, and/or the like. For example, multimedia analysis platform 230 may process text associated with a policy using natural language processing to identify a set of terms and/or phrases included in the text. In some implementations, as described elsewhere herein, multimedia analysis platform 230 may use identified terms and/or phrases to determine whether multimedia content and/or an attempted access to the multimedia content violates a policy.

In some implementations, multimedia analysis platform 230 may identify a set of terms and/or phrases that is semantically similar to the set of terms and/or phrases identified in the policy data. For example, multimedia analysis platform 230 may use a lexical database (e.g., WordNet), a multilingual lexicalized semantic network and ontology (e.g., BabelNet), and/or the like, to identify the set of terms and/or phrases that is semantically similar to the set of terms and/or phrases identified in the policy data.

In this way, identifying a set of terms and/or phrases that is semantically similar to the set of terms and/or phrases identified in the policy data may permit multimedia analysis platform 230 to expand a policy beyond the set of terms and/or phrases identified in the policy data. In some implementations, expanding the policy beyond the set of terms and/or phrases identified in the policy data may increase an accuracy of determining whether multimedia content violates a policy via use of a set of terms and/or phrases that is semantically similar to the set of terms and/or phrases included in the policy data. In addition, this permits a more intelligent analysis of whether multimedia content and/or an attempted access to the multimedia content violates a policy.

In this way, multimedia analysis platform 230 may process the policy data using a first set of techniques, to permit multimedia analysis platform 230 to determine a first set of embeddings.

As further shown in FIG. 4, process 400 may include determining a first set of embeddings for the set of terms and/or phrases after identifying the set of terms and/or phrases (block 430). For example, multimedia analysis platform 230 may determine a first set of embeddings for the set of terms and/or phrases after identifying the set of terms and/or phrases. In some implementations, the first set of embeddings may identify the policy data (e.g., terms included in the policy data, terms similar to terms included in the policy data, etc.).

In some implementations, multimedia analysis platform 230 may determine the first set of embeddings using a technique. For example, multimedia analysis platform 230 may determine the first set of embeddings using Word2Vec, global vectors (GloVe), and/or the like. In some implementations, an embedding may include a mapping of a term and/or phrase to an n-dimensional vector of real numbers. In some implementations, to generate the mapping, multimedia analysis platform 230 may use a neural network, dimensionality reduction on a word or term co-occurrence matrix, a probabilistic model, and/or explicit representation in relation to a context in which a word or term appears. In some implementations, an embedding may quantify and/or categorize semantic similarities between linguistic items (e.g., words, terms, phrases, etc.) based on a manner in which the linguistic items are distributed in samples of language data (e.g., text). In some implementations, generating an embedding may include performing a mathematical embedding from a space with one dimension per word or term to a continuous vector space with a lower dimension.

In some implementations, multimedia analysis platform 230 may determine a score associated with an embedding. For example, multimedia analysis platform 230 may determine a score for each dimension of an embedding. In some implementations, a score may be based on a context of an identified term and/or phrase (e.g., terms and/or phrases identified in policy data), a frequency of the term and/or phrase being included in policy data, a result of performing machine learning and/or using artificial intelligence (e.g., determining that policy data being analyzed is similar to other policy data on which multimedia analysis platform 230 was trained), a degree to which other terms and/or phrases are semantically similar to terms and/or phrases identified in the policy data, and/or the like.

As a specific example, if multimedia analysis platform 230 identifies the term "war" in policy data, multimedia analysis platform 230 may determine a score for other dimensions identified by the terms "violence," "fighting," "nudity," and/or the like that indicates a degree to which those dimensions are associated with "war." In some implementations, a threshold score, or a higher score relative to a lower score, may indicate that a dimension is more closely associated with an identified term and/or phrase. For example, if multimedia analysis platform 230 determines a score of 0.7 for a "violence" dimension and a score of 0.1 for a "nudity" dimension, multimedia analysis platform 230 determine that the violence dimension is more closely associated with "war" relative to "nudity."

Continuing with the previous example, multimedia analysis platform 230 may determine that multimedia content that includes "violence"-related content is more likely to violate a restriction on "war"-related content relative to "nudity"-related content. In this way, multimedia analysis platform 230 may determine a score for various dimensions associated with an embedding that indicates a likelihood that the dimensions are associated with the embedding. This provides multimedia analysis platform 230 with flexibility to intelligently analyze multimedia content, thereby improving an analysis of multimedia content.

In this way, multimedia analysis platform 230 may determine the first set of embeddings for the set of terms and/or phrases after identifying the set of terms and/or phrases and prior to processing the multimedia data and/or the metadata to determine a second set of embeddings.

As further shown in FIG. 4, process 400 may include processing the multimedia data and/or the metadata using a second set of techniques to determine a second set of embeddings that identifies the multimedia data and/or the metadata (block 440). For example, multimedia analysis platform 230 may process the multimedia data and/or the metadata using a second set of techniques to determine a second set of embeddings that identifies the multimedia data and/or the metadata. In some implementations, a technique, of the second set of techniques, may be associated with a type of data. For example, a first technique may be associated with audio data, a second technique may be associated with video data, a third technique may be associated with metadata, and/or the like.

In some implementations, multimedia analysis platform 230 may process the multimedia data and/or the metadata using the second set of techniques to identify an object in an image, a particular type of motion in video content, particular types of sounds in audio content, and/or the like. In some implementations, when processing the multimedia data and/or the metadata, multimedia analysis platform 230 may process millions, billions, trillions, etc. of data elements. In this way, multimedia analysis platform 230 may process a data set that cannot be processed manually or objectively by a human actor. Additionally, or alternatively, multimedia analysis platform 230 may process metadata and/or multimedia data associated with hundreds, thousands, millions, etc. of items of multimedia content, requests for multimedia content, and/or the like.

In some implementations, when processing audio data, multimedia analysis platform 230 may extract audio sequences from the audio data. For example, multimedia analysis platform 230 may extract equal length audio sequences from the audio data. In some implementations, multimedia analysis platform 230 may process the audio sequences using a recurrent neural network. For example, multimedia analysis platform 230 may process the audio sequences to identify particular sounds in the audio, such as screaming, fighting, a male voice, a female voice, and/or the like. In some implementations, multimedia analysis platform 230 may determine an embedding for the sounds identified in the audio. For example, multimedia analysis platform 230 may determine an embedding in a manner similar to that described elsewhere herein. Additionally, or alternatively, multimedia analysis platform 230 may determine scores for a set of dimensions associated with an embedding for audio data in a manner similar to that described elsewhere herein.

In some implementations, when processing video data, multimedia analysis platform 230 may extract video sequences from the video data. For example, multimedia analysis platform 230 may extract equal length video sequences from the video data. Additionally, or alternatively, and as another example, multimedia analysis platform 230 may extract frames from the video sequences (e.g., from the video sequences extracted from video data).

In some implementations, multimedia analysis platform 230 may process the frames using a convolutional neural network. For example, multimedia analysis platform 230 may process the frames using a convolutional neural network to identify features of the frames, such as objects shown in the frames. Additionally, or alternatively, multimedia analysis platform 230 may process the frames using a motion extraction model (e.g., an incremental visual tracker to extract motion features from the frames to determine a type of motion or action shown in the frames).

Additionally, or alternatively, multimedia analysis platform 230 may process the frames using a recurrent neural network (e.g., to extract temporal features of the frames, such as a sequence of events shown in video data, an amount of time particular objects or actions are shown in video data, etc.). In some implementations, multimedia analysis platform 230 may determine an embedding for an object, a motion, an action, and/or the like, identified in the video data in a manner similar to that described elsewhere herein. Additionally, or alternatively, multimedia analysis platform 230 may determine scores for a set of dimensions associated with an embedding for video data in a manner similar to that described elsewhere herein.

In some implementations, when processing the metadata, multimedia analysis platform 230 may process the metadata using natural language processing, text analysis, computational linguistics, and/or the like. For example, multimedia analysis platform 230 may process the metadata to identify a term and/or a phrase included in the metadata (e.g., to determine an age of a user of client device 210 associated with the metadata, to determine a location of a user of client device 210 associated with the metadata, to determine an organization with which client device 210 and/or the user of client device 210 is associated, to determine a context of multimedia content based on a description of the multimedia content, etc.). In some implementations, multimedia analysis platform 230 may determine an embedding for the term and/or phrase identified in the metadata in a manner similar to that described elsewhere herein. Additionally, or alternatively, multimedia analysis platform 230 may determine scores for a set of dimensions associated with an embedding for metadata in a manner similar to that described elsewhere herein.

In this way, multimedia analysis platform 230 may process the multimedia data and/or the metadata using a second set of techniques to determine a second set of embeddings prior to processing the first set of embeddings and/or the second set of embeddings using a knowledge graph.

As further shown in FIG. 4, process 400 may include processing the first set of embeddings and/or the second set of embeddings using a knowledge graph to determine whether the multimedia content and/or access by the user violates the policy (block 450). For example, multimedia analysis platform 230 may process the first set of embeddings and/or the second set of embeddings using a knowledge graph to determine whether the multimedia content and/or access by the user violates the policy. In some implementations, multimedia analysis platform 230 may use a knowledge graph to determine whether a user is permitted access to the multimedia content based on an age of the user, a location of the user, an image included in the multimedia content, an object included in the multimedia content, an action shown in the multimedia content, a sound included in the multimedia content, and/or the like (e.g., based on using the knowledge graph to determine whether multimedia content and/or access to the multimedia content satisfies permissions and/or restrictions included in the policy).

In some implementations, multimedia analysis platform 230 may process thousands, millions, billions, etc. of data elements when processing the first set of embeddings and/or the second set of embeddings. In addition, multimedia analysis platform 230 may process data related to thousands, millions, etc. of items of multimedia content and/or requests for multimedia content. Further, multimedia analysis platform 230 may process multimedia content and/or requests for multimedia content with respect to hundreds, thousands, millions, etc. of policies. In this way, multimedia analysis platform 230 may process a data set that cannot be processed manually or objectively by a human actor.

In some implementations, prior to processing the first set of embeddings and/or the second set of embeddings using a knowledge graph, multimedia analysis platform 230 may identify a set of terms associated with an embedding. For example, an embedding may include a set of probabilities for a set of dimensions associated with the embedding. In this case, a subset of the set of probabilities for a set of dimensions may be associated with a term and/or phrase (e.g., an embedding for basketball may be associated with a term "ball" and a set of probabilities for a set of dimensions related to the term "ball"). Continuing still with the previous example, multimedia analysis platform 230 may determine a score (e.g., an average score, a weighted average score, a weighted score, etc.) for each of the terms and/or phrases associated with the embedding based on the set of probabilities associated with the term.

In some implementations, a score may be based on a context of an identified term and/or phrase (e.g., terms and/or phrases identified in text, objects and/or actions identified in video, etc.). Additionally, or alternatively, a score may be based on a frequency of the term and/or phrase being associated with the multimedia content (e.g., a frequency of the term and/or phrase being included in text, a frequency of an object identified by the term and/or phrase being included in video, etc.). Additionally, or alternatively, a score may be based on a result of performing machine learning and/or using artificial intelligence (e.g., determining that data being analyzed is similar to other data on which multimedia analysis platform 230 was trained). In this way, multimedia analysis platform 230 may determine a score that indicates a likelihood that a set of terms and/or phrases associated with an embedding identifies data for which the embedding was generated.

In some implementations, multimedia analysis platform 230 may identify a set of terms and/or phrases associated with the first set of embeddings and/or the second set of embeddings that has a score that satisfies a threshold. In this way, multimedia analysis platform 230 may identify a set of terms and/or phrases that has the highest probability of identifying the multimedia content, the metadata, and/or the policy (e.g., relative to other terms associated with the first set of embeddings and/or the second set of embeddings). For example, for a policy, multimedia analysis platform 230 may identify a set of terms and/or phrases that includes "violence," "nudity," and "age" as identifying the policy.

Additionally, or alternatively, as an example for multimedia content, multimedia analysis platform 230 may identify a set of terms and/or phrases that includes "fighting," "cheering," and "ball" as identifying the multimedia content. Additionally, or alternatively, and as an example for metadata, multimedia analysis platform 230 may identify a set of terms and/or phrases that includes "Saudi Arabia" and "middle east" as identifying a location of a user attempting to access the content, and "nineteen" as identifying an age of the user attempting to access the content. This permits multimedia analysis platform 230 to quickly and efficiently determine whether multimedia content and/or access to the multimedia content violates a policy by using a set of terms and/or phrases that identify the multimedia content, the user, and/or the policy with a threshold likelihood.

In some implementations, when processing the first set of embeddings and/or the second set of embeddings using a knowledge graph, multimedia analysis platform 230 may populate the knowledge graph with information identifying the set of terms and/or phrases associated with the first set of embeddings and/or the second set of embeddings. For example, multimedia analysis platform 230 may structure the set of terms and/or phrases into a set of hierarchical relationships using the knowledge graph, where each term and/or phrase included in the set of terms and/or phrases is a node in the knowledge graph (e.g., a relationship of a parent and child nodes, such as "sport" and "basketball" nodes, where the "basketball" node is a child node of the "sport" node). This permits multimedia analysis platform 230 to quickly and efficiently analyze multimedia content and/or access to the multimedia content in an intelligent manner by permitting multimedia analysis platform 230 to differentiate between granular concepts, such as different types of sports, different contexts, such as an academic context or an entertainment context, and/or the like.

In some implementations, multimedia analysis platform 230 may determine whether multimedia content and/or access by a user violates a policy. For example, multimedia analysis platform 230 may determine whether multimedia content and/or access by a user violates a policy based on a result of using the knowledge graph. In some implementations, multimedia analysis platform 230 may use edges of the knowledge graph to determine whether multimedia content and/or access by a user violates a policy. For example, the edges of the knowledge graph may indicate matches between the multimedia content, access by the user, and/or the policy. For example, the edges of the knowledge graph may indicate that a user accessing the multimedia content is located in Saudi Arabia, that the multimedia content includes nudity, and that a policy prevents users located in Saudi Arabia from accessing multimedia content that includes nudity. Continuing still with the previous example, multimedia analysis platform 230 may determine that the multimedia content and/or the access by the user violates a policy.

In some implementations, multimedia analysis platform 230 may determine a score based on a result of using the knowledge graph to process the first set of embeddings and/or the second set of embeddings. For example, multimedia analysis platform 230 may use the score as a measure of confidence as to whether the multimedia content is correctly identified in the knowledge graph. Continuing with the previous example, the score may be based on other scores previously determined by multimedia analysis platform 230, may be based on, or may indicate, a degree to which information used to populate the knowledge graph matches nodes of the knowledge graph, may be based on, or may indicate, a degree to which nodes associated with multimedia content matches nodes associated with a policy, may be based on, or may indicate, a degree to which multimedia content being analyzed matches known multimedia content, and/or the like. In some implementations, multimedia analysis platform 230 may use the score when performing an action (e.g., may generate a particular recommendation based on a score satisfying a threshold). In this way, multimedia analysis platform 230 may use a score to determine whether identified multimedia content is correctly identified.

In this way, multimedia analysis platform 230 may process the first set of embeddings and/or the second set of embeddings using a knowledge graph to determine whether the multimedia content and/or access by the user violates the policy to permit and/or cause multimedia analysis platform 230 to perform an action based on a result of processing the first set of embeddings and/or the second set of embeddings.

As further shown in FIG. 4, process 400 may include performing an action based on a result of processing the first set of embeddings and/or the second set of embeddings (block 460). For example, multimedia analysis platform 230 may perform an action based on a result of processing the first set of embeddings and/or the second set of embeddings.

In some implementations, multimedia analysis platform 230 may prevent access to the multimedia content. Additionally, or alternatively, multimedia analysis platform 230 may provide a message and/or a notification to client device 210 indicating that the user was denied access to the multimedia content. In some implementations, multimedia analysis platform 230 may record information related to the attempted access (e.g., a date, a time, a username, etc., related to the attempted access). Additionally, or alternatively, multimedia analysis platform 230 may permit access to the multimedia content. Additionally, or alternatively, multimedia analysis platform 230 may provide a message and/or record information related to the attempted access when multimedia analysis platform 230 permits access to multimedia content, in a manner similar to that described above.

In some implementations, multimedia analysis platform 230 may generate a recommendation. For example, multimedia analysis platform 230 may generate a recommendation related to whether access should be provided to the multimedia content. Continuing with the previous example, multimedia analysis platform 230 may determine that access to the content does not violate a policy and that the user attempting to access the content should be permitted to access the content. In some implementations, multimedia analysis platform 230 may provide the recommendation to an administrator (e.g., provide the recommendation for display via client device 210 associated with an administrator), such as to permit the administrator to make a decision as to whether to permit the user to access the content.

In some implementations, multimedia analysis platform 230 may obscure a portion of the multimedia content that violates the policy, such as by removing the portion, blurring a portion of video content or an image, removing a sound from audio content, replacing a sound in the audio content with another sound (e.g., a bleep), and/or the like. Additionally, or alternatively, multimedia analysis platform 230 may provide a filtered version of the multimedia content (e.g., an existing filtered version), such as a television version of an R-rated movie, a radio edit version of an explicit song, and/or the like. In some implementations, multimedia analysis platform 230 may request permission to access the content from another user of another client device 210 on behalf of the user requesting the multimedia content.

In some implementations, multimedia analysis platform 230 may store information that identifies a result of an analysis. For example, multimedia analysis platform 230 may store information that identifies whether multimedia content violates a policy, whether a user is permitted to access multimedia content, and/or the like. In some implementations, multimedia analysis platform 230 may use the stored information to quickly and efficiently determine whether multimedia content and/or access to the content violates a policy, to improve future analyses, and/or the like. This conserves processing resources of multimedia analysis platform 230 by reducing or eliminating a need for multimedia analysis platform 230 to process the same multimedia content multiple times, to analyze access to the multimedia content by the same user multiple times, and/or the like.

In some implementations, multimedia analysis platform 230 may provide a result of an analysis for display via client device 210. For example, multimedia analysis platform 230 may provide a result for display to permit a user of client device 210 to perform a quality review of the analysis, to input information to modify a result of the analysis, and/or the like. In some implementations, multimedia analysis platform 230 may use information received from client device 210 to modify access to multimedia content, to perform machine learning to improve future analyses, and/or the like.

In some implementations, multimedia analysis platform 230 may schedule a meeting. For example, multimedia analysis platform 230 may schedule a meeting related to multimedia content, an attempted access to the multimedia content, and/or the like (e.g., among managers of an organization, lawmakers, etc.). In some implementations, when scheduling a meeting, multimedia analysis platform 230 may use electronic calendars associated with potential meeting attendees to identify an available time for the meeting and may generate a calendar item (e.g., a meeting invite, a meeting request, an appointment, etc.) for the meeting.

In this way, multimedia analysis platform 230 may perform an action based on a result of processing the first set of embeddings and/or the second set of embeddings.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations, described herein, provide a multimedia analysis platform that is capable of automatically analyzing multimedia content and determining whether a policy permits a particular user to access the multimedia content (e.g., based on an age of the user, a location of the user, a type of multimedia content, an organization with which the user is associated, etc.). In this way, the multimedia analysis platform may automatically and dynamically enforce a content-related policy. This improves application of a policy to multimedia content and/or increases an efficiency of applying a policy to multimedia content. In addition, this conserves processing resources that would otherwise be consumed due to an inefficient review of content. Further, this permits review of an amount of content that cannot be processed manually or objectively by a human actor, or processed in a threshold amount of time by a human actor.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
a memory; and
one or more processors to:
receive multimedia data, metadata, and policy data,
the multimedia data being related to multimedia content, and
the policy data being related to a policy that restricts access to particular multimedia content;
process, based on receiving the policy data, the policy data using natural language processing to identify a first set of terms or phrases associated with the policy data;

identify a second set of terms or phrases semantically similar to the first set of terms or phrases;
expand the policy to include the second set of terms or phrases;
determine a first set of embeddings for the first set of terms or phrases and the second set of terms or phrases,
the first set of embeddings identifying the policy data;
determine a set of scores for a set of dimensions associated with an embedding of the first set of embeddings,
the set of scores being based on at least one of:
a context of a particular term or phrase of the first set of terms or phrases or the second set of terms or phrases,
a frequency of the particular term or phrase in the policy data, or
a degree to which other terms or phrases, of the first set of terms or phrase or the second set of terms or phrases, are semantically similar to the particular term or phrase;
process, based on determining the set of scores, the multimedia data and/or the metadata using a set of techniques to determine a second set of embeddings,
the second set of embeddings identifying the multimedia data, and/or
the second set of embeddings identifying the metadata;
process the first set of embeddings and the second set of embeddings using a knowledge graph to determine whether the multimedia content violates the policy; and
perform one or more actions based on a result of processing the first set of embeddings and the second set of embeddings,
the one or more actions including at least one of:
obscuring a portion of the multimedia content,
the multimedia content being accessible with the portion obscured, or
providing a filtered version of the multimedia content,
the filtered version of the multimedia content being accessible.

2. The device of claim 1, where the multimedia data includes:
video data and corresponding audio data; and
where the one or more processors are further to:
align the video data with the corresponding audio data.

3. The device of claim 1, where the one or more processors are further to:
populate the knowledge graph with information related to the first set of embeddings and the second set of embeddings; and
where the one or more processors, when processing the first set of embeddings and the second set of embeddings, are to:
process the first set of embeddings and the second set of embeddings using the knowledge graph after populating the knowledge graph with the information related to the first set of embeddings and the second set of embeddings.

4. The device of claim 1, where the one or more actions are one or more first actions;
where the result is a first result; and
where the one or more processors are further to:
perform a second action based on a second result of processing the first set of embeddings and the second set of embeddings,
the second action including:
preventing the access to the multimedia content
permitting the access to the multimedia content, or
providing a recommendation to an administrator related to whether access should be provided to the multimedia content.

5. The device of claim 1, where the metadata is related to:
a destination to which the multimedia content is to be provided,
a characteristic of a user to whom the multimedia content is to be provided, and/or
a time when the multimedia content is to be provided.

6. A method, comprising:
receiving, by a device, multimedia data, metadata, or policy data,
the multimedia data, the metadata, or the policy data to be used to determine whether multimedia content or access to the multimedia content by a user violates a policy associated with the multimedia content;
processing, by the device and based on receiving the policy data, the policy data using natural language processing to determine a first set of terms or phrases for the policy data;
identifying, by the device, a second set of terms or phrases semantically similar to the first set of terms or phrases;
expanding, by the device, the policy to include the second set of terms or phrases;
determining, by the device, a first set of embeddings for the first set of terms or phrases and the second set of terms or phrases;
determining, by the device, a set of scores for a set of dimensions associated with an embedding of the first set of embeddings,
the set of scores being based on at least one of:
a context of a particular term or phrase of the first set of terms or phrases or the second set of terms or phrases,
a frequency of the particular term or phrase in the policy data, or
a degree to which other terms or phrases, of the first set of terms or phrase or the second set of terms or phrases, are semantically similar to the particular term or phrase;
processing, by the device and based on determining the set of scores, the multimedia data or the metadata using a set of techniques to determine a second set of embeddings for the multimedia data or the metadata;
processing, by the device, the first set of embeddings and the second set of embeddings using a knowledge graph to determine whether the multimedia content or the access by the user violates the policy; and
performing, by the device, one or more actions based on a result of processing the first set of embeddings and the second set of embeddings,
the one or more actions including at least one of:
obscuring a portion of the multimedia content,
the multimedia content being accessible with the portion obscured, or
providing a filtered version of the multimedia content, the filtered version of the multimedia content being accessible.

7. The method of claim 6, where processing the multimedia data or the metadata comprises:
processing the multimedia data or the metadata using a technique, of the set of techniques, associated with a type of the multimedia data or the metadata,
the type including at least one of:
audio data,
video data, or
the metadata.

8. The method of claim 6, where processing the multimedia data or the metadata comprises:
processing audio data to extract a set of audio sequences from the audio data;
processing the set of audio sequences using a recurrent neural network after processing the audio data; and
determining the second set of embeddings for the audio data after processing the set of audio sequences using the recurrent neural network.

9. The method of claim 6, where processing the multimedia data or the metadata comprises:
processing video data to extract a set of video sequences or frames from the video data; and
processing the set of video sequences or frames using a set of neural networks after processing the video data.

10. The method of claim 6, where processing the multimedia data or the metadata comprises:
processing video data using a motion extraction model to identify motion shown in the video data.

11. The method of claim 6, where processing the multimedia data or the metadata comprises:
processing the metadata using a natural language processing technique to identify another set of terms or phrases included in the metadata.

12. A non-transitory computer-readable medium storing instructions, the instructions comprising:
one or more instructions that, when executed by one or more processors, cause the one or more processors to:
receive multimedia data, metadata, and/or policy data,
the multimedia data being related to multimedia content,
the metadata being related to a destination to which the multimedia content is to be provided, and
the policy data being related to a policy that restricts access to particular multimedia content or from a particular destination;
process, based on receiving the policy data, the policy data using natural language processing to identify a first set of terms or phrases associated with the policy data;
identify a second set of terms or phrases semantically similar to the first set of terms or phrases;
expand the policy to include the second set of terms or phrases;
determine a first set of embeddings for the first set of terms or phrases and the second set of terms or phrases to permit determination of whether the multimedia content or the access from the destination violates the policy,
the first set of embeddings identifying information associated with the policy;
determine a set of scores for a set of dimensions associated with an embedding of the first set of embeddings,
the set of scores being based on at least one of:
a context of a particular term or phrase of the first set of terms or phrases or the second set of terms or phrases,
a frequency of the particular term or phrase in the policy data, or
a degree to which other terms or phrases, of the first set of terms or phrase or the second set of terms or phrases, are semantically similar to the particular term or phrase;
process, based on determining the set of scores, the multimedia data or the metadata using a set of techniques to determine a second set of embeddings,
the second set of embeddings identifying information associated with the multimedia content or the destination to which the multimedia content is to be provided;
process the first set of embeddings and the second set of embeddings to determine whether the multimedia content or the access from the destination violates the policy; and
perform one or more actions related to the multimedia content or the access to the multimedia content from the destination after processing the first set of embeddings and the second set of embeddings,
the one or more actions including at least one of:
obscuring a portion of the multimedia content,
the multimedia content being accessible with the portion obscured, or
providing a filtered version of the multimedia content,
the filtered version of the multimedia content being accessible.

13. The non-transitory computer-readable medium of claim 12, where the set of scores are averaged or weighted prior to processing the first set of embeddings or the second set of embeddings using a knowledge graph.

14. The non-transitory computer-readable medium of claim 12, where the one or more instructions, when executed by the one or more processors, further cause the one or more processors to:
populate a knowledge graph with information associated with the first set of embeddings and the second set of embeddings; and
where the one or more instructions, that cause the one or more processors to process the first set of embeddings and the second set of embeddings, cause the one or more processors to:
process the first set of embeddings and the second set of embeddings after populating the knowledge graph.

15. The non-transitory computer-readable medium of claim 14, where the one or more instructions, when executed by the one or more processors, further cause the one or more processors to:
determine whether the multimedia content or the access from the destination violates the policy based on edges of the knowledge graph; and
determine a result of processing the first set of embeddings and the second set of embeddings after determining whether the multimedia content or the access from the destination violates the policy.

16. The non-transitory computer-readable medium of claim 12, where the one or more instructions, when executed by the one or more processors, further cause the one or more processors to:

record information related to whether the multimedia content or the access from the destination violates the policy.

17. The non-transitory computer-readable medium of claim 12, where the one or more instructions, when executed by the one or more processors, further cause the one or more processors to:

generate a report related to a result of processing the first set of embeddings and the second set of embeddings.

18. The device of claim 1, where the one or more actions further include:

recording information related to an attempted access of the multimedia content.

19. The device of claim 1, where the one or more actions further include:

sending a request to another device requesting permission to access the multimedia content.

20. The method of claim 6, where obscuring the portion of the multimedia content comprises at least one of:

blurring a video portion of the multimedia content, blurring an image portion of the multimedia content, or replacing a sound in an audio portion of the multimedia content.

\* \* \* \* \*